US010324829B2

(12) United States Patent
Clement

(10) Patent No.: US 10,324,829 B2
(45) Date of Patent: Jun. 18, 2019

(54) APPLICATION TESTING

(71) Applicant: ENTIT Software LLC, Sunnyvale, CA (US)

(72) Inventor: Arnaud Gaston Claude Clement, Shanghai (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/747,297

(22) PCT Filed: Jul. 30, 2015

(86) PCT No.: PCT/CN2015/085581
§ 371 (c)(1),
(2) Date: Jan. 24, 2018

(87) PCT Pub. No.: WO2017/015955
PCT Pub. Date: Feb. 2, 2017

(65) Prior Publication Data
US 2018/0217922 A1 Aug. 2, 2018

(51) Int. Cl.
G06F 9/44 (2018.01)
G06F 11/36 (2006.01)
G06F 16/22 (2019.01)

(52) U.S. Cl.
CPC ...... G06F 11/3688 (2013.01); G06F 11/3692 (2013.01); G06F 16/2246 (2019.01)

(58) Field of Classification Search
CPC ............. G06F 11/3466; G06F 11/3688; G06F 2201/865; G06F 11/3664; G06F 11/3409

USPC ................................. 717/124–131
See application file for complete search history.

(56) References Cited

U.S. PATENT DOCUMENTS 6,948,153 B2 * 9/2005 Bowers ............... G06F 11/3684
434/323
7,904,890 B1 3/2011 Hsieh et al.
8,006,138 B2 8/2011 Nir-Buchbinder et al.
8,266,592 B2 9/2012 Beto et al.
8,291,384 B2 10/2012 Takahashi
8,601,441 B2 12/2013 Kaulgud et al.
(Continued)

FOREIGN PATENT DOCUMENTS

CN 103136095 6/2013
CN 104572463 4/2015

OTHER PUBLICATIONS

International Search Report and Written Opinion dated Apr. 27, 2016, PCT Patent Application No. PCT/CN2015/085581 dated Jul. 30, 2015, State Intellectual Property Office of the PP Chief.
(Continued)

Primary Examiner — Chuck O Kendall

(57) ABSTRACT

Application testing is disclosed in the present disclosure. An interface structure may be extracted from source code of an application under test (AUT), and the interface structure may be separated into subsections. Then a primary test may be performed for the AUT by using test code to execute the subsections. An assertion strategy in the test code may be evaluated based on a predefined assertion requirement to obtain a first measurement result of the AUT, in which the assertion strategy may be to assert an execution result of the test code executing the subsections.

15 Claims, 10 Drawing Sheets

(56) References Cited

U.S. PATENT DOCUMENTS

2007/0088986 A1     4/2007    Stark et al.
2012/0254665 A1    10/2012    Pasala et al.

OTHER PUBLICATIONS

Alemerien K et al. "Examining the Effectiveness of Testing Coverage Tools; an Empirical Study" (Research paper) Jun. 1, 2014 http://www.sersc.com/journals/IJSEA/vol8. p. 5 2014/12.pdf.

* cited by examiner

APPLICATION TESTING

BACKGROUND

In application development, before an application is released, source code of the application may be tested using test code. The test code may include instructions to execute the source code so as to automatically test the source code.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of examples, in which modules or procedures shown in the figures are not necessarily essential for implementing the present disclosure. In other issuances, well-known methods, procedures, components, and circuits have not been described in detail so as not to unnecessarily obscure aspects of the examples.

At present, there are some measurement tools to control the efficiency of test code when testing source code of an application. For example, code coverage is one of these measurement tools. Code coverage may refer to the degree to which the source code of the application is executed by a particular set of test code, and can provide software developers with information about which piece of source code is executed as well as which is not. However, a piece of source code being executed may not mean that the source code is verified. For example, a function in the source code is executed, but a result of executing the function may not be verified to learn whether the function is correctly written.

Application testing to evaluate how thoroughly source code of an application under test (AUT) is tested by test code is described according to examples of the present disclosure. According to the examples, the testing may include whether the source code of the AUT responds correctly to a number of different types of inputs. Possible interface structures, e.g., I/O structures may be extracted from the source code the AUT, and then assertion strategies contained in the text code related to the interface structures may be compared with predefined assertion requirements to obtain an evaluation result of the AUT.

Figure 1:
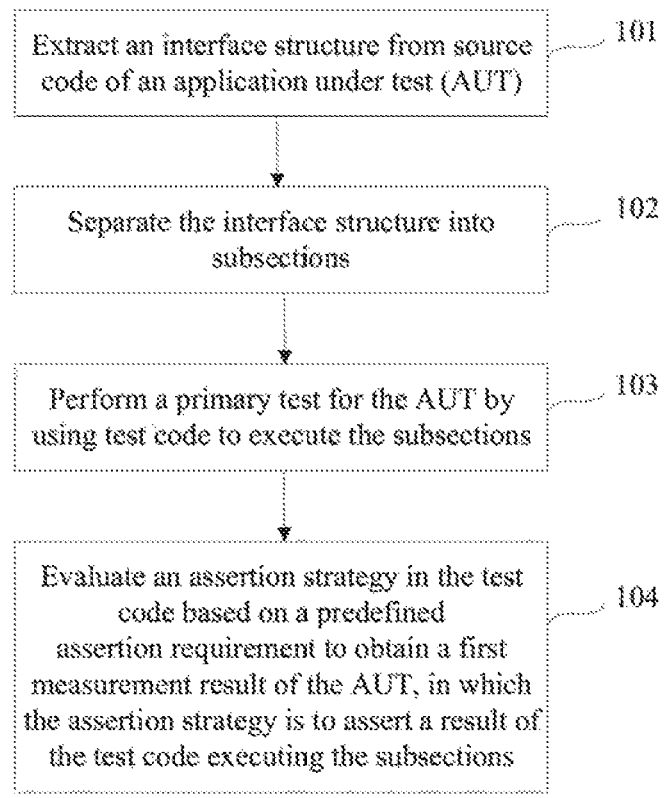
FIG. 1 is a flowchart illustrating a method for application testing according to an example of the present disclosure.

FIG. 1 is a flowchart illustrating a method for application testing according to an example of the present disclosure. As shown in FIG. 1, the method for application testing may include the following procedures.

At block 101, an interface structure may be extracted from source code of an application under test (AUT).

The AUT may refer to a software program contains source code. The source code may be a set of computer instructions typically written using a certain human-readable computer language, such as C, C++, or the Java programming language. The source code may be usually transformed by a compiler program into low-level machine code understood by, for example, a computer.

In most programming languages, for example, in C, C++, or Java programming languages, the source code of an AUT may be structured into two parts: interface structure (or signature) and implementation. An interface structure may refer to an entry point of the AUT and may be publically accessible by other functions or methods of the AUT. An interface structure may be a set of routines, protocols, and tools for building the AUT, and may express a software component in terms of its operations, inputs, outputs, and underlying types. Interface structures between software components may provide: constants, data types, types of procedures, exception specifications and methods signatures. Sometimes, public variables may be also defined as part of an interface structure. For example, the interface structure of a software module may be deliberately defined separately from the implementation of that module. The implementation may be realization of an interface structure, and may contain actual code of procedures and methods specified in the interface structure, as well as other "private" variables, procedures, etc.

Figure 2:
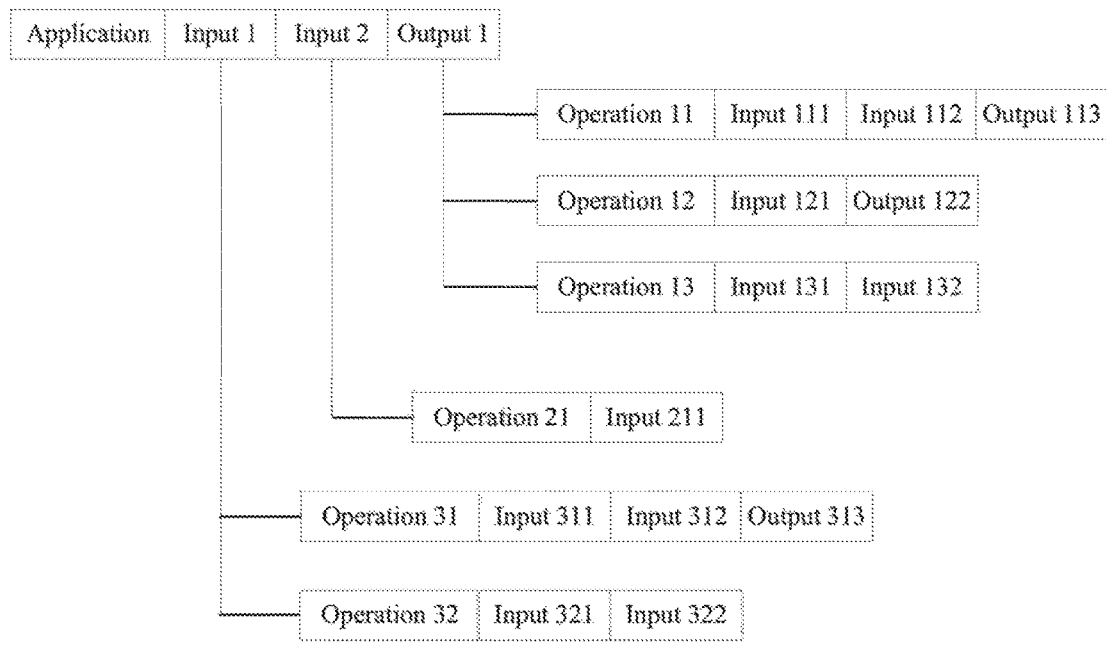
FIG. 2 is a hierarchical structure of an application under test (AUT) according to an example of the present disclosure.

Refer to FIG. 2 which is a hierarchical structure of an AUT according to an example of the present disclosure. The AUT in FIG. 2 may have three interface structures: input 1, input 2, and output 1 which may have their own subsection. The interface structures input 1, input 2, and output 1 may be extracted from the AUT respectively.

At block 102, the interface structure may be separated into subsections. For example, the interface structure may be separated into operation subsections, and an operation subsection may be separated into input subsections and output subsections.

Refer again to FIG. 2. Input 1 may be further separated into two subsections which may be operation 31 and operation 32. An operation may be a function available as part of a structure which could access to internal information contained in the structure, for example an addition function for a calculator structure. Operation 31 may include three subsections which may be input 311, input 312, and output 313. An input may be information provided at an entrance of an operation, for example, a numerical value "1" which would be added to a current calculator value; and an output may be information returned from an operation after execution of the operation, for example a result of execution of the addition function. Operation 32 may include two subsections which may be input 321, and output 322. Input 2 may include a subsection which may be operation 21. Operation 21 may further include a subsection, e.g., input 211. Output 1 may be separated into three operation subsections which may be operation 11, operation 12, and operation 13. Operation 11 may be further separated into three subsections which may be input 111, input 112, and output 113. Operation 12 may be further separated into two subsection which may be input 121, and output 122. Operation 13 may be further separated into two subsections which may be input 131 and input 132.

At block 103, a primary test way be performed for the AUT by using test code to execute the subsections.

The test code may be a set of computer instructions to be performed on the source code to test that the source code functions as expected. In the AUT shown in FIG. 2, each line of code in the three interface structures may be respectively executed using the test code to carry out a primary test.

At block 104, an assertion strategy in the test code may be evaluated based on a predefined assertion requirement to obtain a first measurement result of the AUT. The assertion strategy may be to assert a result of the test code executing the subsections.

The assertion strategy may be an assertion which may be a statement that predicate (Boolean-valued function, a true-false expression) is expected to be true at a point in the code. The predefined assertion requirement may be a list of expected efficient assertions to be performed corresponding to the interface structures. There may be multiple assertion strategies and/or multiple assertion requirements.

As part of testing workflow, each input and output (I/O) in an interface structure may be executed and asserted in order to cheek if they are as expected. If these I/Os are basic data structures (numbers, byte arrays, etc.), the "as expected" check may be very simple. In case of complex structure, only observable via interface operations, the "as expected" check may be quite equivalent (in term of complexity) to checking the overall interface structure being reduced to each I/O.

Refer to FIG. 2 again, assume that in the interface structure input 1, according to a predefined assertion requirement, an assertion strategy defined in the test code for input 1 does not meet the predefined assertion requirement, and assertion of both output 313 and output 322 fails. Thus, since these are totally five subsections contained in the interface structure input 1, and the assertion of the two subsections is failed, a first measurement result of the AUT of FIG. 2 of 60% may be obtained.

Figure 3:
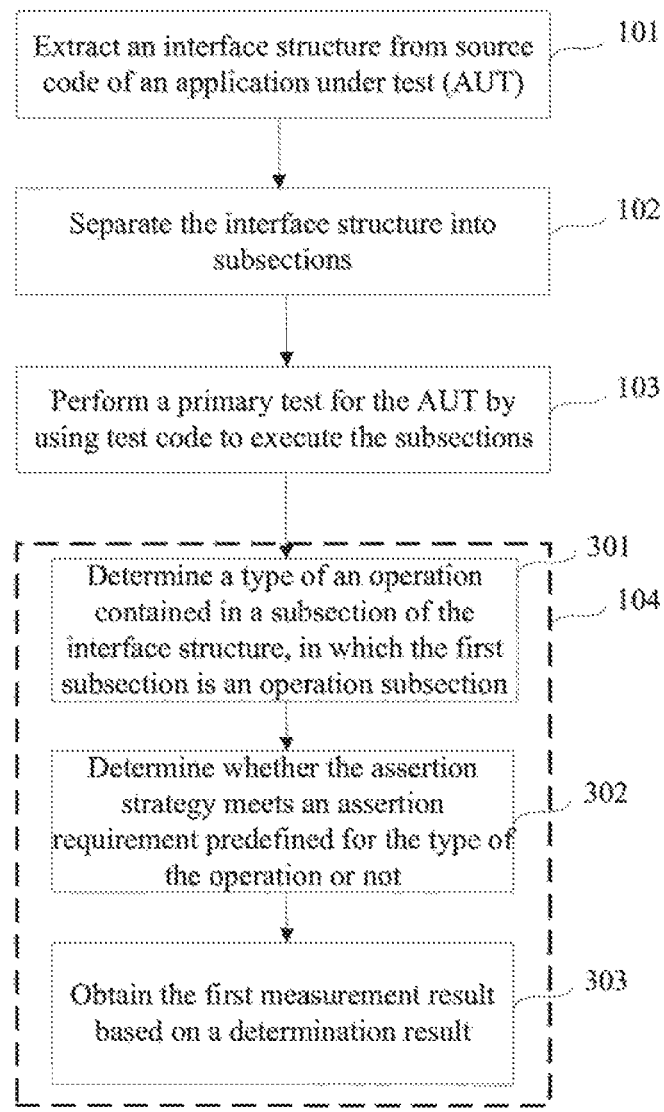
FIG. 3 is a flowchart illustrating a method for application testing according to an example of the present disclosure.

FIG. 3 is a flowchart illustrating a method for application testing according to an example of the present disclosure based on FIG. 1.

In FIG. 3, block 104 may further include the following procedures.

At block 301, a type of an operation contained in an operation subsection of the interface structure may be determined.

The test code may determine the type of the operation according to organization and definition of objects in a programming language. For example, a specific declaration may be used to declare a type of an operation in a programming language. Based on the declaration, the type of the operation may be determined. For example, the operation may be determined to be a mutable object or an immutable object in the C++ programming language, or may be a mutable object such as the ArrayList function in the Java programming language.

At block 302, it may be determined whether the assertion strategy meets an assertion requirement predefined for the type of the operation.

According to the example of the present disclosure, different assertion requirements may be predefined for different types of operations. For example, for a mutable object, the predefined assertion requirement may require performing assertions to check a reference of a returned object, and check the contest of the mutable object as a first parameter.

In this block, what assertions are performed on the source code may be determined. Then, it is determined whether all assertions predefined in the assertion requirement are performed by the assertions is the assertion strategy.

At block 303, the first measurement result may be obtained based on a determination result obtained from block 302.

For example, if it is determined that the assertion strategy defined in the test code for the mutable object has not checked a reference of the returned object, then a certain score may be deduced from the a measurement result of the mutable object.

Figure 4:
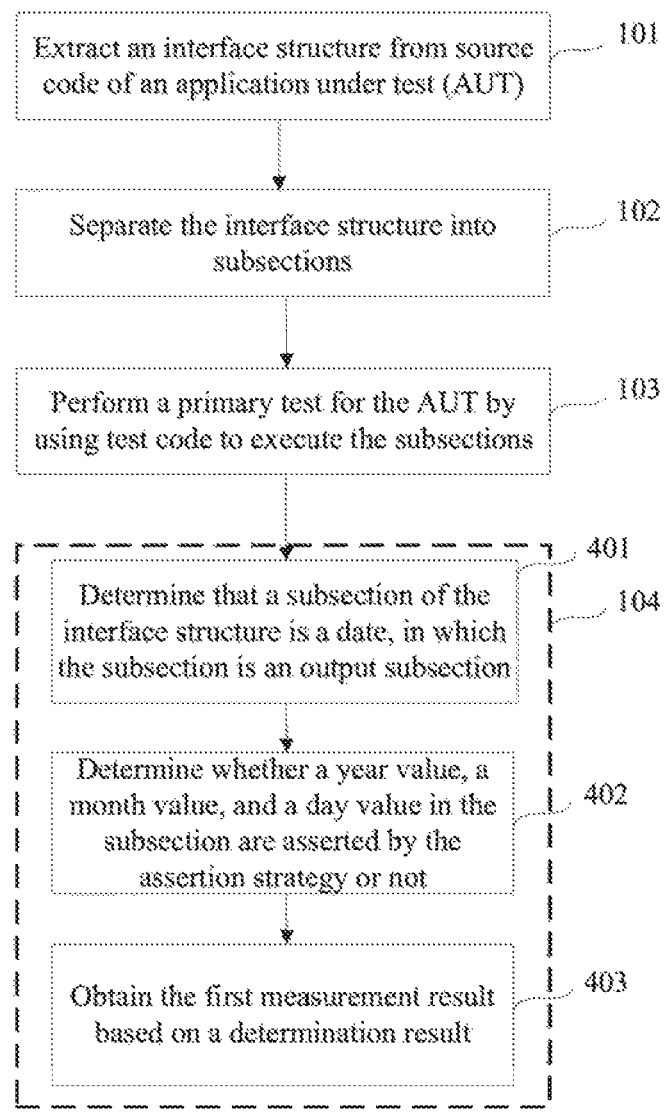
FIG. 4 is a flowchart illustrating a method for application testing according to an example of the present disclosure.

FIG. 4 is a flowchart illustrating a method for application testing according to another example of the present disclosure based on FIG. 1.

As shows in FIG. 4, the block 104 may further include the following procedures.

At block 401, an output subsection of the interface structure may be determined to be a date.

At block 402, it may be determined whether a year value, a month value, and a day value in the output subsection are asserted by the assertion strategy.

In this block, since a value of a date may contain a year value, a month value, and a day value. Then these values should be asserted by the assertion strategy to determine whether they are correct.

At block 403, the first measurement result may be obtained based on a determination result obtained from block 402.

For example, if one of the year value, the month value, or the day value is not asserted or is asserted not to be correct, then a certain percentage of score may be subtracted from the first measurement result.

Figure 5:
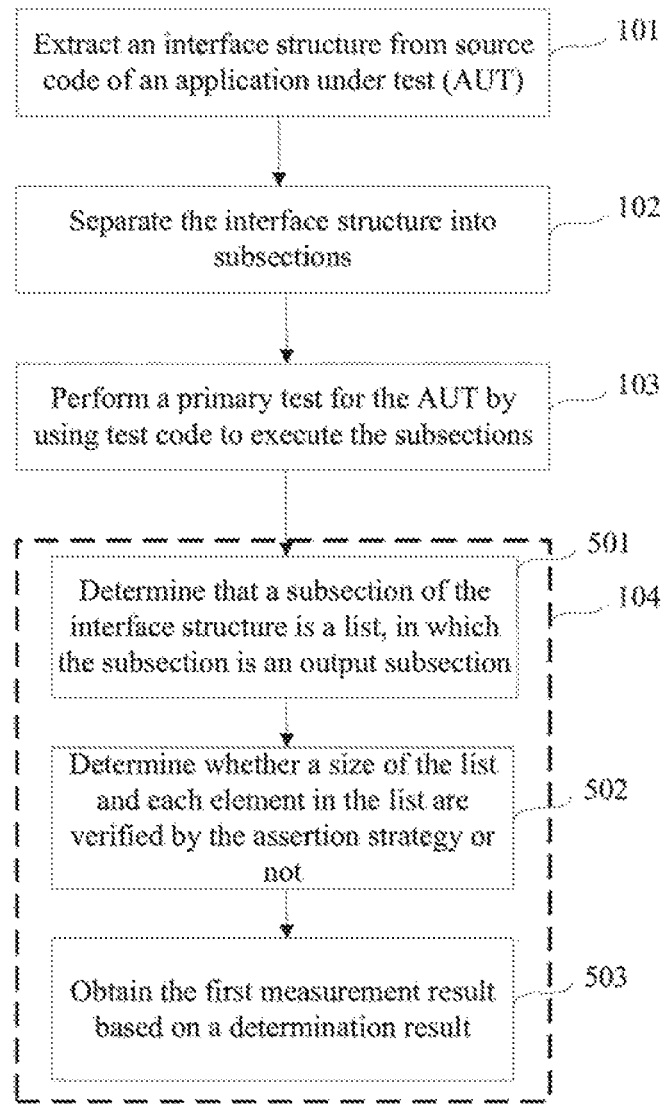
FIG. 5 is a flowchart illustrating a method for application testing according to an example of the present disclosure.

FIG. 5 is a flowchart illustrating a method for application testing according to a further example of the present disclosure based on FIG. 1.

As shown in FIG. 5, the block 104 may further include the following procedures.

At block 501, it may be determined that an output subsection of the interface structure is a list.

At block 502, it may be determined whether a size of the list and each element in the list are verified by the assertion strategy or not. The size may refer to the number of elements in the list.

At block 503, the first measurement result may be obtained based on a determination result obtained in block 502.

For example, if the size of the list is not asserted by the assertion strategy, then a certain percentage of score may be subtracted from the first measurement result.

With the examples of the present disclosure, if the output of a function in a subsection of the interface structure returns a list, but an assertion strategy in the test code only asserts or verifies the size of the list, and a predefined assertion requirement may define that the size of the list and each element in the list needs to be asserted. Then, there may be a mismatch between the assertion strategy and the expected assertion requirement, and the test does not cover the source code efficiently according to the measurement.

Figure 6:
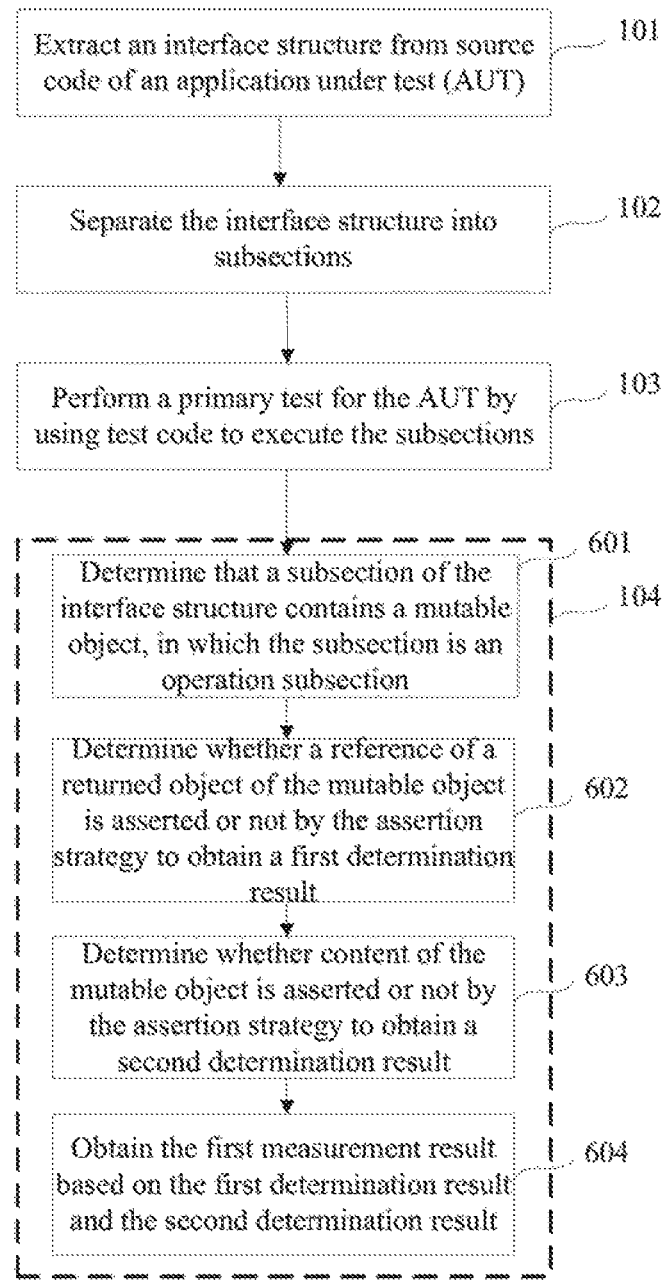
FIG. 6 is a flowchart illustrating a method for application testing according to an example of the present disclosure.

FIG. 6 is a flowchart illustrating a method for application testing according to another example of the present disclosure based on FIG. 1.

As shown in FIG. 6, the block 104 includes the following procedures.

As block 601, it may be determined that an operation subsection of the interface structure contains a mutable object. For example, the mutable object may be the ArrayList function in the Java programming language.

At block 602, it may be determined whether a reference of a returned object of the mutable object is asserted or not by the assertion strategy to obtain a first determination result.

At block 603, it is determined whether content of the mutable object is asserted or not by the assertion strategy to obtain a second determination result.

Thus, in this example, in case or a mutable object, in order to evaluate the measurement result of the test, the predefined assertion requirement may define asserting the reference of a returned object, and asserting the content of a unstable object provided as first parameter.

That is, when source code uses a memory block (or object), the memory block (or object) should be asserted. If a memory block is provided as an input of a function, then whether the memory block is modified by the function or not should be asserted.

In case of a structural operand (like an object), the predefined assertion requirement may define: if a compare function is used (like equals( ) in Java), then considering the structured operand as being fully asserted, whatever the implementation of this method (it should tested on its own separately), or if a compare function is not used, each internal field should be accessed via getters (or publicly) in order to assert the content of the structured operand. These assertion operations should also be performed by the assertion strategy.

At block 604, the first measurement result may be obtained based on the first determination result and the second determination result.

For example, if based on the first determination result, the reference of the returned object of the mutable object has not be asserted by the assertion strategy, a certain score percentage may be removed from 100% to obtain the first measurement result.

Figure 7:
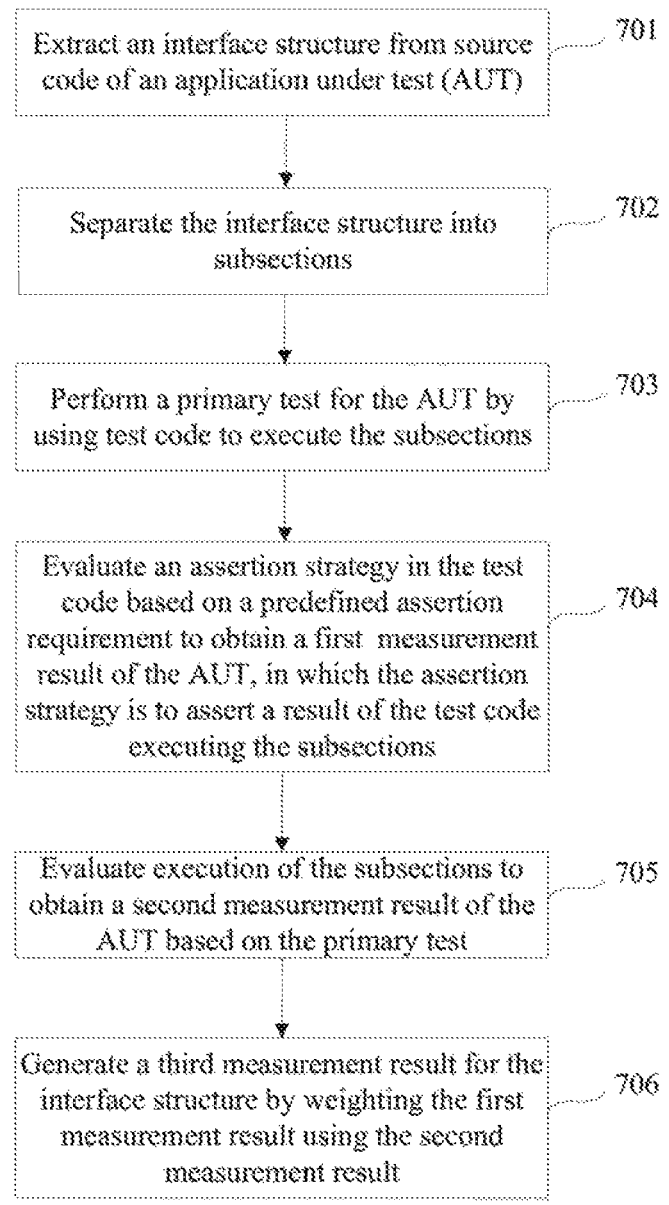
FIG. 7 is a flowchart illustrating a method for application testing according to an example of the present disclosure.

FIG. 7 is a flowchart illustrating a method for application testing according to an example of the present disclosure.

As shown in FIG. 7, at block 701, an interface structure may be extracted from source code of an application under test (AUT).

At block 702, the interface structure may be separated into subsections.

At block 703, a primary test may be performed for the AUT by using test code to execute the subsections.

At block 704, an assertion strategy in the test code may be evaluated based on a predefined assertion requirement to obtain a first measurement result of the AUT. The assertion strategy may be to assert a result of the test code executing the subsections.

The procedures in blocks 701-704 may be similar with those in blocks 101-104 of FIG. 1, and will not be elaborated herein. For detailed information please refer to the foregoing description for blocks 101-104.

At block 705, execution of the subsections may be evaluated to obtain a second measurement result of the AUT based on the primary test.

In this block, execution of the subsections of the interface structure may be evaluated to obtain code coverage as the second measurement result of the interface structure.

There may be some metric for determining, the code coverage, for example:
function coverage: this metric may be to determine whether each function (or subroutine) in a subsection has been called or not;
statement coverage: this metric may be to determine whether each statement in a subsection has been executed or not;
branch coverage; this metric may be to determine whether each branch (also called decision-to-decision path) of each control structure (such as in if and case statements) in a subsection has been executed or not; and
condition coverage (or predicate coverage): this metric may be to determine whether each Boolean sub-expression in a subsection has been evaluated both to true and false or not.

At block 706, a third measurement result may be generated for the interface structure by using the second measurement result as weight factor of the first measurement result.

Its this block, the code coverage of the interface structure obtained in block 305 may be used as a weight factor to weight the test coverage obtained in block 304 to generate a measurement result of testing the AUT.

In an example, the source code or the code to be tested may be a public object including an addition function which performs addition of values of two inputs; variables "a" and "b". However, in the public object, implementation of the addition function may define that a value of "a+b−1" should be returned as an output of the addition function. The test code may define calling the addition function and assigning a value "0" to both "a" and "b" to execute the addition function. According to code coverage metrics, the code coverage of this test may be 100% which may be used as the second measurement result of testing the source code. However, in this example, since the source code is to return a value of "a+b−1" as the output of the addition function, a wrong output "1" will be returned instead of "0". By further asserting the output of the function, this error may be found. And an assertion result which is the first measurement result of testing the source code may be 0%. In this way, an overall measurement result, i.e., the third measurement result of testing the source code may be (100%*0%)=0%. The source code and the test code may be in the Java programing language.

For the example as shown in FIG. 2, assume the assertion of input 322 and output 313 respectively contained in operation 31 and operation 32 of the interface structure input 1 is failed, and then the first measurement result of the AUT may be 60%. Assume that the code coverage of the interlace structure input 1 is 100%, e.g., each line of the code in the interface structure input 1 being executed, and therefore the second measurement result of the AUT is 100%. Thus, the third measurement result of the AUT which is obtained by using the second measurement result as at factor to weight the first measurement result will be 100%*60%=60%.

In another example, the source code may be a public String object including a concatenation function which concatenates two inputs: strings "a" and "b". In the public String object, implementation of the concatenation function may define that this String object will return "a+b" as an output of the String object. For example, a concatenation of strings "123" and "456" is "123456". Then the test code may define calling the concatenation function, and assigning a value "123" to "a" and "456" to "b" to execute the concatenation function. Further, the test code may define verifying a length of a returned value of executing the concatenation function. In this example, the source code and the test code may be in the Java programming language.

From the test code, it can be seen that the concatenation function is executed, i.e., the code coverage may be 100% which is the second measurement result of the source code. However, the assertion strategy in the test code does not fully check the output content of executing the concatenation function, just a part of the output content, i.e., the length. If a predefined assertion requirement defines that the String object is composed of 10 methods, then this assertion strategy may cover 10% of the result. Then, the first measurement result of the source code may be 10%. Thus, an overall measurement result, i.e., the third measurement result of this test may be 10%*100%=10%.

An efficient predefined assertion requirement and/or assertion strategy of the test code may define performing a check on the overall returned output. For example, the test code may define comparing the content of the output of executing the concatenation result with an expected value.

Figure 8:
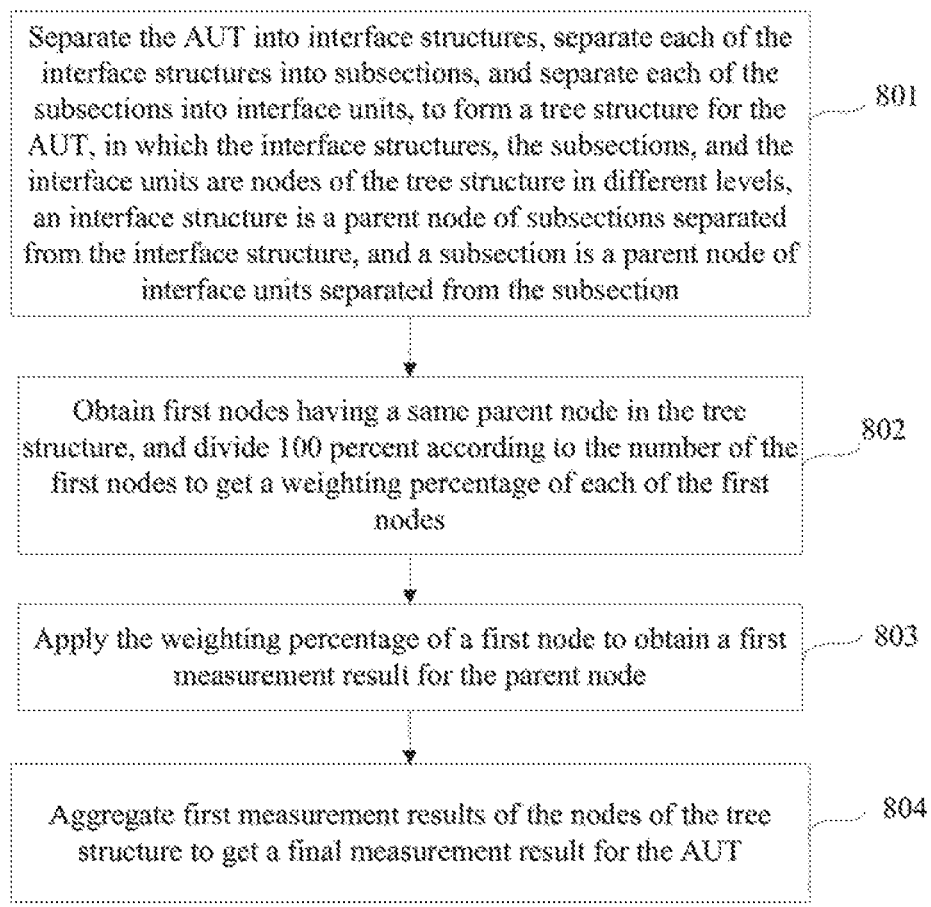
FIG. 8 is a flowchart illustrating a method for application testing according to an example of the present disclosure.

FIG. 8 is a flowchart illustrating a method for application testing according to an example of the present disclosure.

As shown in FIG. 8, the method includes the following procedures.

At block 801, an AUT may be separated into interface structures, each of the interface structures may be separated into subsections, and each of the subsections may be separated into interface units, to form a tree structure for the AUT. The interface structures, the subsections, and the interface units may be nodes of the tree structure in different levels. An interface structure may be a parent node of subsections separated from the interface structure, and the subsections may be children nodes of the interface structure. A subsection may be a parent node of interface units separated from the subsection, and the interface units may be children nodes of the subsection.

This block may correspond to blocks 101 and 102 in FIG. 1. For detailed information please refer to FIG. 1.

At block 802, first nodes having a same parent node in the tree structure may be obtained, and 100 percent may be divided by the number of the first nodes to get a weighting percentage of each of the first nodes. In this way, the nodes having a same parent node may occupy a same percentage of weight when evaluating a measurement result of the parent node of the nodes.

As block 803, the weighting percentage of a first node may be applied to obtain a first measurement result for the parent node of the first node.

After primary tests are performed for all the interface structure in the AUT (please refer to the description for block 103 in FIG. 1), when the first measurement result is calculated for an interface structure using the method in block 104 of FIG. 1, weighting percentages of subsections in the interface structure may be used.

At block 804, first measurement results of the nodes of the tree structure may be aggregated to get a final measurement result for the AUT.

In the foregoing blocks of the method shown in FIG. 8, similar operations may be performed as those of the method shown in FIG. 1, and will not be elaborated herein.

In blocks 802-804, a size of an interface structure, a size of a subsection, and a size of an interface unit may be used as factors to obtain a final measurement result of the AUT.

For example, the size may refer to the number of operations in an interface structure, and/or the number of I/Os in an operation.

If an interface structure contains multiple operations (method calls, constructors, etc.) to be checked, each operation may be equally split by the test code. Each operand of one operation (a mutable parameter, a returned value, etc.) will equally participate to the scoring of the operation. As an example, a measurement result of a structured operand based on internal fields may be evaluated based on an equal weight of each field.

In an example, the test code may define two calls to two operations such as functions of an object in the interface structure and execute the two operations. According to a method of an example of the present disclosure, each operation may equally weigh 50%. Assume that the first call or operation is scored 70% and the second one is scored 30% after the assertion strategy in the test code is evaluated based on a predefined assertion requirement. In this example, the assertion strategy in the test code may be asserting the size of a returned result of the function concatList( ) and the value of the last element of the list. The predefined assertion requirement may be that the object should be asserted fully for each operation, and not incrementally. Then an overall measurement result of the test code (50%*70%)+(50%*30%)=50% may be obtained.

In another example, the source code may be a function of adding a new entry to a list, for example, the ArrayList function in Java programming language. The inputs of the function may be the list itself and a new element to add. The output of the mutable function is a new list which should contain all the original elements of the input list and the new element. According to the assertion strategy in the test code, the size of a returned list and its last element may be asserted. However, even if the test asserts the content of the returned object, as it is a mutable object, however, according to a predefined assertion requirement, what should be tested is also reference, or at least to compare it.

An assertion may be performed to assert whether a memory block (e.g., a set of memory as used to store a structure during operation execution) which is returned by the function is in fact the same memory block as an input of the function, i.e., asserting the output list is the same object as the input one.

Than, in this example, in case of a mutable object, in order to evaluate the score of the test, the predefined assertion retirement may define: asserting the reference of a returned object, and asserting the content of a mutable object provided as first parameter.

That is, when source code uses a memory block (or object), the memory block (or object) should be asserted. If a memory block is provided as an input of a function, then whether the memory block is modified by the function or not should be asserted.

In case of a structured operand (like an object), the predefined assertion requirement may define: if a compare function is used (like equals( ) in Java), then considering the structured operand as being fully checked, whatever the implementation of this method (it should tested on its own separately); or it compare function is not used, each internal field should be accessed via getters (or publicly) in order to check the content of the structured operand.

According to an example of the present disclosure, in order to establish a scoring, a penalty strategy may be applied. For example, for each detected lack or failure in testing, a pre-defined "malus" may be deduced from the maximum score (e.g., 100%). For example, for a String structure, "checking only its length" could have a malus value of 75%, and "checking its content without case support" would have a mains value of 20%.

Figure 9:
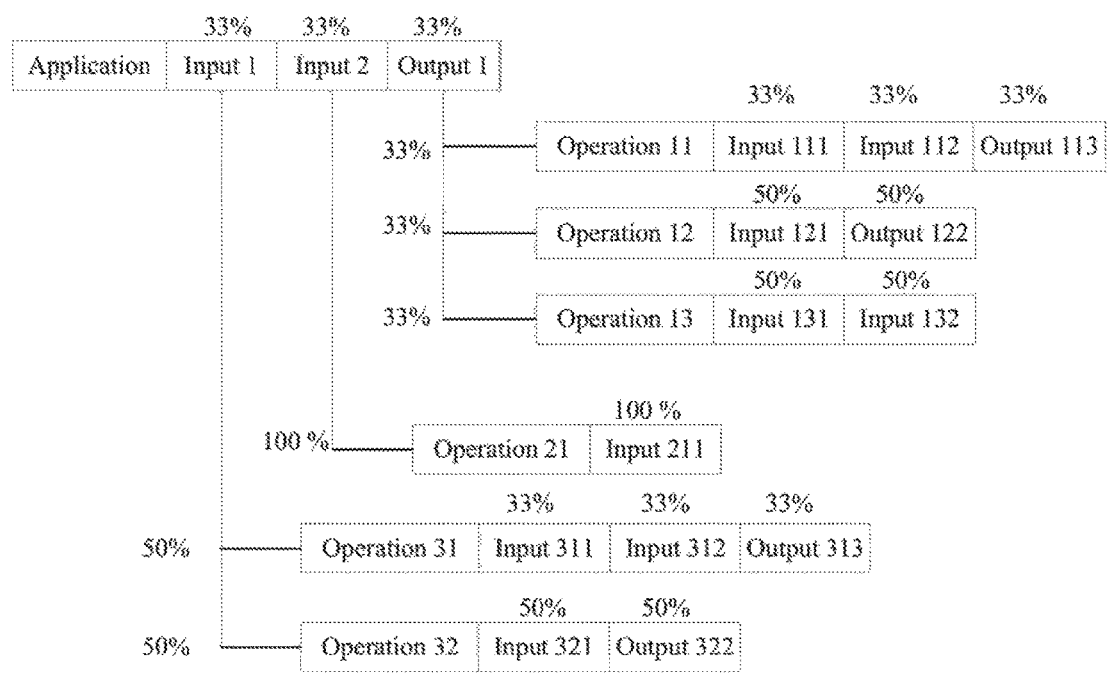
FIG. 9 is a hierarchical structure of an AUT according to an example of the present disclosure.

FIG. 9 is a hierarchical structure of the AUT based on FIG. 2, which is used to further illustrate the method in FIG. 8.

As shown in FIG. 9, children nodes (inputs, outputs, or operations) of a parent node (an input, an output, or an operation) may be equally weighted, for example, on the percentage of testing score aspect, when the assertion strategy in the test code associated with the subsections may be evaluated based on a predefined requirement to obtain the first measurement result.

As can be seen front FIG. 9, the AUT includes three interface structures input 1, input 2, and output 1 on a same level. Then, each of them may be assigned a weight of 33% which is obtained by dividing 100% by 3 and then rounding a divided result. Input 1 has two operations 31, and 32, and each of the operations may be assigned a weight of 50%. For Operation 31, since it has three I/Os, then each I/O may be assigned a weight of 50%. For operation 31, since it has two I/Os, then each I/O may be assigned a weight of 50%. Input 2 has an operation 21, and then the operation 21 has a weight of 100%. The output 1 has three operations, i.e., operation 11, operation 12, and operation 13, and then each of the operation has a weight of 33%. For operation 11, it has three I/Os which has an equal weight of 33%. Operation 12 has two I/Os each of which has an equal weight of 50%. Operation 13 has two I/Os each of which has an equal weight of 50%.

Assume that in the interface structure input 1, according to the predefined assertion requirements, the assertion strategy defined in the test code for input 1 does not meet the predefined assertion requirements, then testing of both output 313 and output 322 fail. Then, a measurement result of input 1 will be (33%*100%+33%*100%+0)*50%+(50%*100%*0)*50%=33%+25%=58%. Since input 1 occupies 33% of the interface structures of the AUT, then an actual test result for input 1 in the AUT will be (58%*33%)=19.14%, which may be rounded to be 19%. Assume that the values of test coverage of input 2 and output 1 are 100% respectively. Then a test result for the AUT will be (19%+22%+33%)=85% at the application level.

In this way, the method of application testing may generate a more aggressive reporting of the quality of testing, and it may provide more accurate global evaluation as the size of each function (LOC) is used to weight a final result of testing.

The method shown in FIG. 8 may be performed together with the method shown in FIG. 7, i.e., combining with the code coverage metric. In this ease, an equal percentage of weight may be assigned to children nodes of a parent node based on the number of the children nodes when third measurement results are obtained for the interface structures. Then the third measurement results of the interface structures may be aggregated.

The methods in the examples of the present disclosure may be integrated as part of continuous integration (CI) as a new failure criterion (like the code coverage) if an overall scoring of a measurement result may be too low. The CI is a tool used to execute all the tests of an application each time the code is modified. In general, such a tool provides a lot of metrics in order to determine if the application is ready for delivery.

An apparatus for application testing may include: a source control management (SCM) machine to store the source code of the overall application and test code; an target execution machine to practically execute the test code in an environment compatible with the execution requirements of the application; a quality analysis machine to generate metrics and quality reports by analyzing the source code of the applicant and the test code; and a continuous integration (CI) machine to retrieve the source code of the application and its related test code from the SCM machine, trigger a quality analysis, prepare the testing binaries for a target execution environment, retrieve all the results of the tests, and present an overall report of each integration cycle.

Figure 10:
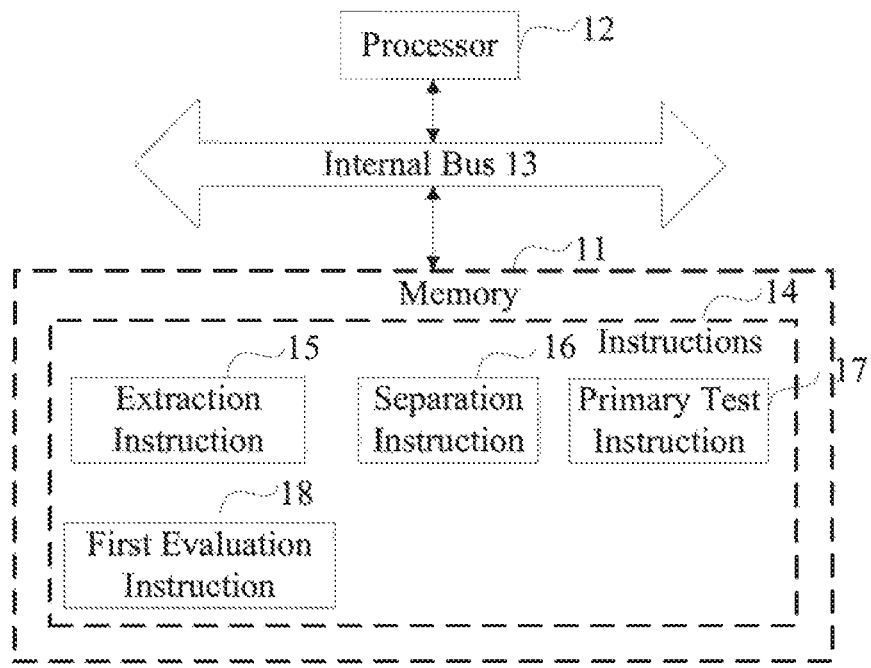
FIG. 10 is an apparatus for application testing according to an example of the present disclosure.

FIG. 10 is an apparatus for application testing according to an example of the present disclosure. The apparatus may be implemented on a computer, and includes a non-transitory storage medium 11 and a processor 12 connected with the storage medium 11 via an internal bus 13. The non-transitory storage medium 11 may store machine readable instructions 14 that executable by the processor 12.

The machine readable instructions 14 may include: an extraction instruction 15, a separation instruction 16, a primary test instruction 17, and a first evaluation instruction 18.

The extraction instruction 15 may be to extract an interface structure from source code of an application under test (AUT).

The separation instruction 16 may be to separate the interface structure into subsections.

The primary test instruction 17 may be to perform a primary test for the AUT by using test code to execute the subsections The first evaluation instruction 18 may be to evaluate an assertion strategy in the test code based on a predefined assertion requirement to obtain a first measurement result of the AUT. The assertion strategy may be to assert an execution result of the test code executing the subsections.

Figure 11:
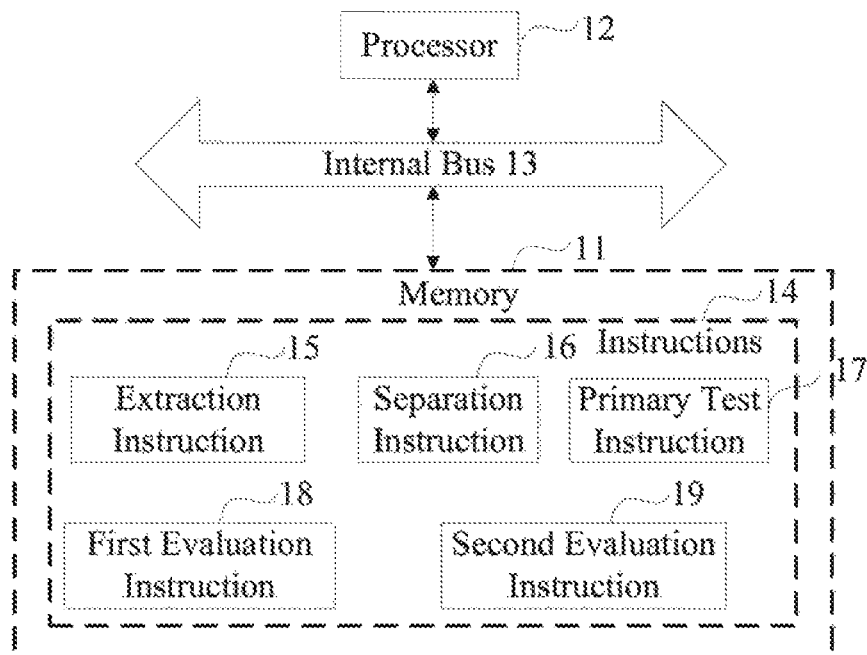
FIG. 11 is an apparatus for application testing according to an example of the present disclosure.

The machine readable instructions 14 may further include a second evaluation instruction 19 (As shown in FIG. 11) which may be to evaluate execution of the subsections to obtain a second measurement result of the AUT based on the primary test, and a generation instruction to generate a third measurement result of the AUT by weighting the first measurement result using the second measurement result.

The first evaluation instruction 18 may be further to determine a type of an operation contained in a subsection of the interface structure, in which the subsection may be an operation subsection; determine whether the assertion strategy meets an assertion requirement predefined for the type of the operation or not; and obtain the first measurement result based on a determination result.

A predefined value may be subtracted from the first measurement result in response to determining that an assertion predefined in the assertion requirement is not performed for the operation by the assertion strategy correspondingly.

The first evaluation instruction 18 may be further to determine that a subsection of the interface structure is a date; determine whether a year value, a month value, and a day value in the subsection are asserted by the assertion strategy or not; and obtain the first measurement result based on a determination result. The subsection may be an output subsection.

The first evaluation instruction 18 may be further to determine that a subsection of the interface structure is a list; determine whether a size of the list and each element in the list are verified by the assertion strategy or not; and obtain the first measurement result based on a determination result. The subsection may be an output subsection.

The first evaluation instruction 18 may be further to determine that a subsection of the interface structure contains a mutable object; determine whether a reference of a returned object of the mutable object is asserted or not by the assertion strategy to get a first determination result; determine whether content of the mutable object is asserted or not by the assertion strategy to obtain a second determination result; and obtain the first measurement result based on the first determination result and the second determination result. The subjection may be an operation subsection.

The first evaluation instruction 18 may be further to: in response to determining that the mutable object is a structured operand, determine that the content of the mutable object is asserted in case that a compare function is executed for the structured operand; and determine whether each internal field of the structured operand is accessed via a getter to get the second determination result in case that no compare function is executed for the structured operand.

The machine readable instructions 14 may be executable by the processor to: separate the AUT into interface structures, separate each of the interface structures into subsections, and separate each of the subsections into interface units, to form a tree structure for the AUT in which the interface structures, the subsections, and the interface units may be nodes of the tree structure in different levels, in which an interface structure may be a parent node of subsections separated from the interface structure, and a subsection may be a parent node of interface units separated from the subsection; obtain first nodes having a same parent node in the tree structure, and divide 100 percent according to the number of the first nodes to get a weighting percentage of each of the first nodes; apply the weighting percentage of a first node to obtain a first measurement result for the parent node of the first node; and aggregate first measurement results of the nodes of the tree structure to get a final measurement result for the AUT.

The non-transitory storage device may be a magnetic disk, an optical disk, a read-only memory (ROM), a random access memory (RAM), etc.

According to the examples of the present disclosure, by extracting the interface structures from the AUT and testing the interface structures, workload of a user may be reduced.

It should be noted that, in some implementations, the blocks in the flowcharts may be performed out of the order illustrated, depending on the functions of the blocks. For example, two blocks shown in succession may be executed concurrently.

What is described in the foregoing are only examples of the present disclosure, and should not be construed as limitations to the present disclosure. Any changes, equivalent replacements, modifications made without departing from the scope and spirit of the present disclosure are intended to be included within the protecting scope of the present disclosure.

What is claimed is:

1. A machine implemented method for application testing, comprising:
    extracting an interface structure from source code of an application under test (AUT);
    separating the interface structure into subsections;
    performing a primary test for the AUT by using test code to execute the subsections;
    evaluating an assertion strategy in the test code based on a predefined assertion requirement to obtain a first measurement result of the AUT, wherein the assertion strategy is to assert an execution result of the test code executing the subsections; and
    evaluating execution of the subsections to obtain a second measurement result of the AUT based on the primary test, wherein the second measurement result is obtained utilizing a first metric indicating if each statement in an evaluated subsection of the interface structure has been executed and a second metric indicating if each branch of each control structure in the evaluated subsection of the interface structure has been executed.

2. The method of claim 1, further comprising:
    generating a third measurement result of the AUT by weighting the first measurement resulting using the second measurement result.

3. The method of claim 1, wherein evaluating the assertion strategy in the test code based on the predefined assertion requirement to obtain the first measurement result of the AUT comprises:
    determining a type of an operation in a subsection of the interface structure, wherein the subsection is an operation subsection;
    determining whether the assertion strategy meets an assertion requirement predefined for the type of the operation or not; and
    obtaining the first measurement result based on a determination result.

4. The method of claim 3, wherein obtaining the first measurement result of the AUT based on the determination result comprises:
    subtracting a predefined value from the first measurement result in response to determining that an assertion predefined in the assertion requirement is not performed for the operation by the assertion strategy correspondingly.

5. The method of claim 1, wherein evaluating the assertion strategy in the test code based on the predefined assertion requirement to obtain the first measurement result of the AUT comprises:
    determining that a subsection of the interface structure is a date, wherein the subsection is an output subsection;
    determining whether a year value, a month value, and a day value in the subsection are asserted by the assertion strategy or not; and
    obtaining the first measurement result based on a determination result.

6. The method of claim 1, wherein evaluating the assertion strategy in the test code based on the predefined assertion requirement to obtain the first measurement result of the AUT comprises:
    determining that a subsection of the interface is a list, wherein the subsection is an output subsection;
    determining whether a size of the list and each element in the list are verified by the assertion strategy or not; and
    obtaining the first measurement result based on a determination result.

7. The method of claim 1, wherein evaluating the assertion strategy in the test code based on the predefined assertion requirement to obtain the first measurement result of the AUT comprises:
    determining that a subsection of the interface structure comprises a mutable object, wherein the subsection is an operation subsection;
    determining whether a reference of a returned object of the mutable object is asserted or not by the assertion strategy to get a first determination result;
    determining whether content of the mutable object is asserted or not by the assertion strategy to obtain a second determination result; and obtaining the first measurement result based on the first determination result and the second determination result.

8. The method of claim 7, wherein determining whether the content of the mutable object is asserted or not by the assertion strategy to obtain the second determination result comprises:

in response to determining that the mutable object is a structured operand, determining that the content of the mutable object is asserted in case that a compare function is executed for the structured operand; and determining whether each internal field of the structured operand is accessed via a getter to get the second determination result in case that no compare function is executed for the structured operand.

9. The method of claim 1, further comprises:

separating the AUT into interface structures, separating each of the interface structures into subsections, and separating each of the subsections into interface units, to form a tree structure for the AUT, wherein the interface structures, the subsections, and the interface units are nodes of the tree structure in different levels, an interface structure is a parent node of subsections separated from the interface structure, and a subsection is a parent node of the interface units separated from the subsection;

obtaining first notes having the same parent node in the tree structure, and dividing 100 percent according to the number of the first nodes to get a weighting percentage of each of the first nodes;

applying the weighting percentage of a first node to obtain a first measurement result for the parent node of the first node; and aggregating the first measurement results of the nodes of the tree structure to get a final measurement result of the AUT.

10. An apparatus for application testing comprising:

a processor; and a non-transitory storage medium to store machine readable instructions that when executed by the processor cause the processor to:

extract an interface structure from source code of an application under test (AUT);

separate the interface structure into subsections;

perform a primary test for the AUT by using test code to execute the subsections; and evaluate an assertion strategy in the test code based on a predefined assertion requirement to obtain a first measurement result of the AUT, wherein the assertion strategy is to assert an execution result of the test code executing the subsections; and evaluate execution of the subsections to obtain a second measurement result of the AUT based on the primary test, wherein the second measurement result is obtained utilizing a first metric indicating if each statement in an evaluated subsection of the interface structure has been executed and a second metric indicating if each branch of each control structure in the evaluated subsection of the interface structure has been executed.

11. The apparatus of claim 10, wherein the machine readable instructions when executed by the processor cause the processor to:

generate a third measurement result of the AUT by weighting the first measurement result using the second measurement result.

12. The apparatus of claim 10, wherein the machine readable instructions when executed by the processor cause the processor to:

separate the AUT into the interface structures, separate each of the interface structures into subsections, and separate each of the subsections into interface units, to form a tree structure for the AUT, wherein the interface structures, the subsections, and the interface units are nodes of the tree structure in different levels, an interface structure is a parent node of the subsections separated from the interface structure, and a subsection is a parent node of interface units separated from the subsection;

obtaining first nodes having the same parent node in the tree structure, and divide 100 percent according to the number of the first nodes to get a weighting percentage of each of the first nodes;

apply the weighting percentage of a first node to obtain a first measurement result for the parent node of the first node; and aggregate firs measurement results of the nodes of the tree structure to get a final measurement result for the AUT.

13. A non-transitory machine readable storage medium storing machine readable instructions executable by a processor to:

extract an interface structure into subsections;

perform a primary test for the AUT by using test code to execute the subsections; and evaluate an assertion strategy in the test code based on a predefined assertion requirement to obtain a first measurement result of the AUT, wherein the assertion strategy is to assert an execution result of the test code executing the subsections; and evaluate execution of the subsections to obtain a second measurement result of the AUT based on the primary test, wherein the second measurement result is obtained utilizing a first metric indicating if each statement in an evaluated subsection of the interface structure has been executed and a second metric indicating if each branch of each control structure in the evaluated subsection of the interface structure has been executed.

14. The apparatus of claim 13, wherein the machine readable instructions are executable by the processor to:

generate a third measurement result of the AUT by weighting the first measurement result using the second measurement result.

15. The non-transitory machine readable storage medium of claim 13, wherein the machine readable instructions are executable by the processor to:

separate the AUT into interface structures, separate each of the interface structures into subsections, and separate each of the subsections into interface units, to form a tree structure for the AUT, wherein the interface structures, the subsections, and the interface units are nodes of the tree structure in different levels, an interface structure is a parent node of subsections separated from the interface structure, and a subsection is a parent node of interface units separated from the subsection;

obtain first nodes having a same parent node in the tree structure, and divide 100 percent according to the number of the first nodes to get a weighting percentage of each of the first nodes;

apply the weighing percentage of a first node to obtain a first measurement result for the parent node of the first node; and aggregate first measurement results of the nodes of the tree structure to get a final measurement result of the AUT.

* * * * *